United States Patent [19]

Arudi

[11] Patent Number: 5,503,938
[45] Date of Patent: Apr. 2, 1996

[54] SELF-WETTING BINDERS FOR MAGNETIC MEDIA

[75] Inventor: Ravindra L. Arudi, Woodbury, Minn.

[73] Assignee: Minnesota Mining and Manufacturing Company, St. Paul, Minn.

[21] Appl. No.: 329,492

[22] Filed: Oct. 26, 1994

[51] Int. Cl.⁶ ........................................ C08F 8/30
[52] U.S. Cl. .................. 428/423.1; 428/900; 522/90; 525/127; 525/395; 525/457
[58] Field of Search ................. 428/423.1, 900; 522/90; 525/127, 395, 457

[56] References Cited

U.S. PATENT DOCUMENTS

| | | | |
|---|---|---|---|
| 4,861,683 | 8/1989 | Nakachi et al. | 428/694 |
| 5,008,357 | 4/1991 | Nakachi et al. | 526/292.2 |
| 5,028,676 | 7/1991 | Nakachi et al. | 526/277 |
| 5,098,783 | 3/1992 | Watnabe et al. | 428/323 |
| 5,139,892 | 8/1992 | Nakachi et al. | 428/694 |
| 5,322,897 | 6/1994 | Jung et al. | 525/123 |

FOREIGN PATENT DOCUMENTS

| | | |
|---|---|---|
| 0536956A1 | 4/1993 | European Pat. Off. . |
| 63-162664 | 7/1988 | Japan . |
| 61-234124 | 9/1988 | Japan . |
| 01137428A | 5/1989 | Japan . |
| 01156337A | 6/1989 | Japan . |

*Primary Examiner*—James J. Seidleck
*Assistant Examiner*—R. F. Johnson
*Attorney, Agent, or Firm*—Gary L. Griswold; Walter N. Kirn; Susan Moeller Zerull

[57] ABSTRACT

This invention is a quaternary ammonium/isocyanate compound having the formula $$OCN-Z-Q^+A^-,$$

wherein

Z is a divalent organic moiety;

Q is a quaternary ammonium moiety; and

A is a monovalent anionic counterion. Use of this quaternary ammonium/isocyanate compound or its amine/isocyanate compound enables one to convert any hydroxy containing binder into a self-wetting binder.

17 Claims, No Drawings

SELF-WETTING BINDERS FOR MAGNETIC MEDIA

BACKGROUND OF THE INVENTION

1. Technical Field

The present invention relates to magnetic recording media, and more particularly to magnetic recording media whose magnetic layer contain polymers having quaternary ammonium moieties and amine moieties. The present invention also relates to such polymers themselves and to a quaternary ammonium isocyanate compound and an amine isocyanate compound used to produce the polymers.

2. Background Information

Magnetic recording media generally comprise a magnetic layer coated onto at least one side of a non-magnetizable substrate. For particulate magnetic recording media, the magnetic layer comprises a magnetic pigment dispersed in a polymeric binder. The magnetic layer may also include other components such as lubricants, abrasives, thermal stabilizers, catalysts, crosslinkers, antioxidants, dispersants, wetting agents, fungicides, bactericides, surfactants, antistatic agents, nonmagnetic pigments, coating aids, and the like.

The polymeric binders of the magnetic layer are commonly derived from polymers which require curing in order to provide magnetic recording media with appropriate physical and electromagnetic properties. To prepare such media, the components of the magnetic layer are combined with a suitable solvent and thoroughly mixed to form a homogeneous dispersion. The resulting dispersion is then coated onto the non-magnetizable substrate, after which the coating is dried, calendared if desired, and then cured.

The polymeric binders of magnetic recording media are most commonly prepared from polymer blends comprising a hard component, i.e., a polymer with relatively high glass transition temperature and modulus, and a soft component, i.e., a polymer with relatively low glass transition temperature and modulus. In the past polyurethane polymers have been widely used as the soft component, while vinyl chloride or vinylidene chloride copolymers have been widely used as the hard component.

Magnetic pigments tend to agglomerate and can be difficult to initially disperse in the polymeric binder or be difficult to keep dispersed in the polymeric binder over time. Low molecular weight wetting agents, or dispersants, are often employed to facilitate such dispersion. For higher pigment loadings, i.e., the use of greater amounts by weight of magnetic pigment, greater amounts of wetting agent or dispersant may be required. This is not always desirable since dispersants tend to plasticize binder systems and decrease their modulus. Further, excess dispersant may exude from a cured binder system over time, leading to changes in the properties of the media as well as to contamination of a recording head or the like.

To help alleviate the problems associated with low molecular weight dispersants or wetting agents, polymeric binders formed from "self-wetting" polymers have been developed. "Self-wetting" polymers have dispersing groups pendant from the polymer backbone that help disperse the magnetic pigment. Representative examples of dispersing groups include quaternary ammonium, amines, heterocyclic moieties, salts or acids based on sulfate, salts or acids based on sulfonate, salts or acids based on phosphate, salts or acids based on phosphonate, salts or acids based on carboxyl, mixtures thereof, and the like. As a result of using self-wetting polymers, little, if any, low molecular weight dispersant or wetting agent may be needed to further help disperse the pigments in the polymeric binder.

Polymers with quaternary ammonium groups that are useful as binders have generally been made either by incorporating the amine structure into the polymer backbone and subsequently quaternizing it or by incorporating the ammonium structure directly into the polymer backbone. Neither method allows for much flexibility and in both cases solubility and viscosity become critical issues.

SUMMARY OF THE INVENTION

We have developed a compound having a quaternary ammonium moiety and an isocyanate group. Use of this quaternary ammonium/isocyanate compound or its amine/isocyanate precursor enables one to convert any hydroxy containing binder into a self-wetting binder. The present invention, therefore, allows for much more flexibility than did the prior art means in developing self-wetting binders having pendant quaternary ammonium groups.

Thus, in a first embodiment this invention is a quaternary ammonium/isocyanate compound, wherein said compound has the formula

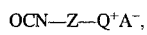

wherein

Z is a divalent organic moiety;

Q is a quaternary ammonium moiety; and

A is a monovalent anionic counterion.

In a second embodiment this invention is an amine isocyanate compound of the formula

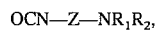

wherein

Z is a divalent organic moiety; and $R_1$ and $R_2$ independently are alkyl or aryl groups.

This invention is also a process for making the above quaternary ammonium/isocyanate and amine/isocyanate compounds. This process comprises the steps of a) reacting a diisocyanate with a substantially equimolar amount of a hydroxy-functional tertiary amine to form a compound comprising a tertiary amine moiety and an isocyanate moiety, said diisocyanate being characterized in that after one of the NCO groups reacts with the hydroxy-functional tertiary amine the reactivity of the unreacted NCO group decreases substantially; and b) if the quaternary ammonium/isocyanate compound is desired, further reacting the amine/isocyanate compound with a substantially equimolar amount of a quaternizing agent to convert the tertiary amine moiety into a quaternary ammonium moiety.

In yet another embodiment this invention is a self-wetting polymer comprising a plurality of chain segments of the formula

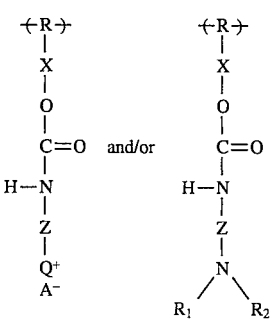

wherein,

R is a segment of the polymer backbone;

X is a single bond or a divalent linking group;

Z is a divalent organic moiety;

$Q^+$ is a quaternary ammonium moiety;

$A^-$ is a monovalent anionic counterion; and $R_1'$ and $R_2'$ are independently alkyl or aryl groups.

The invention is further embodied by a dispersion comprising the above self-wetting polymers and pigment particles.

The invention is also embodied in a process for making this self-wetting polymer by reacting the quaternary ammonium/isocyanate compound and/or the amine/isocyanate compound with a hydroxy-functional polymer under conditions such that the hydroxy groups of the hydroxy functional polymer react with the NCO groups of the quaternary ammonium/isocyanate and/or the amine/isocyanate compound.

Finally, the invention is embodied in a magnetic recording medium, comprising a magnetizable layer provided on a non-magnetizable support, wherein the magnetizable layer comprises magnetic pigment particles dispersed in a polymeric binder, said binder being a cured blend of components comprising a self-wetting polymer comprising a plurality of chain segments of the formula

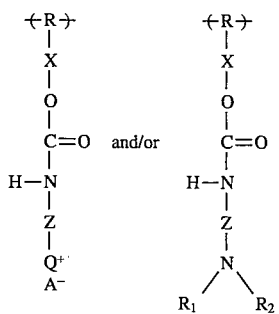

wherein

R is a segment of the polymer backbone;

X is a single bond or a divalent linking group;

Z is a divalent organic moiety;

$Q^+$ is a quaternary ammonium moiety;

$A^-$ is a monovalent anionic counterion; and $R_1'$ and $R_2'$ are independently alkyl or aryl groups.

DETAILED DESCRIPTION OF THE INVENTION

The quaternary ammonium/isocyanate compound has the formula $$OCN-Z-Q^+A^-$$

wherein,

Z is a divalent organic moiety;

$Q^+$ is a quaternary ammonium moiety; and $A^-$ is a monovalent anionic counterion.

The quaternary ammonium moiety, $Q^+$, may preferably be represented by the formula

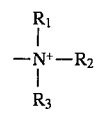

wherein each of $R_1$, $R_2$, and $R_3$ is independently an alkyl group or an aryl group. $R_1$, $R_2$, and $R_3$ preferably represent independently a lower alkyl group of 1 to 4 carbon atoms, and most preferably represent —$CH_3$.

$A^-$ may indicate any monovalent counterion. The selection of the counterion effects such things as solubility of the of the quaternary ammonium, isocyanate compound. Examples of suitable counterions include $I^-$, $Cl^-$, alkyl or aryl sulfates, $Br^-$, sulfobetaines, phosphobetaines, etc. Methyl sulfates are particularly preferred due to good solubility in common solvents such as methyl ethyl ketone, good reactivity and stability and overall ease of synthesis.

Nonlimiting examples of moieties suitable for use as the divalent linking group, Z, include straight, branched or cyclic alkylene, arylene, aralkylene, polyalkylene oxide, polyalkylene sulfide and polyester moieties. However, Z is preferably of the formula $$-R_5-N(H)-\overset{\overset{O}{\|}}{C}-O-R_6-$$

wherein each of $R_5$ and $R_6$ is independently a divalent, organic linking group. The divalent linking groups, $R_5$ and $R_6$ may be such things as straight, branched or cyclic alkylene, arylene, aralkylene, polyalkylene oxide, polyalkylene sulfide and polyester moieties. $R_6$ is preferably a lower alkyl group, and most preferably is —$CH_2CH_2$—. $R_5$ is preferably a divalent organic moiety in which both valent sites of $R_5$ are carbon atoms having a different degree of substitution than the carbon atom at the other valent site. In an especially preferred embodiment $R_5$ has the formula

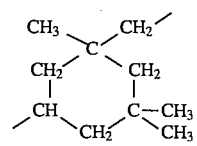

The amine isocyanate compound of this invention may serve as a precursor to the quaternary ammonium isocyanate compound or may itself be reacted with a hydroxy containing polymer to form a self-wetting binder with amine pendant groups. Such polymeric binders with amine pendant groups are particularly suitable for dispersing acidic pigments. The amine isocyanate compound has the formula $$OCN-Z-NR_1R_2,$$

wherein

Z and $R_1$ and $R_2$ are defined as above. The preferred embodiments for Z, $R_1$, $R_2$, $R_5$, and $R_6$ are also as set forth above.

According to the preferred approach, the amine/isocyanate compound may be produced by reacting a diisocyanate with a substantially equimolar or slight excess amount of a tertiary amine group as follows:

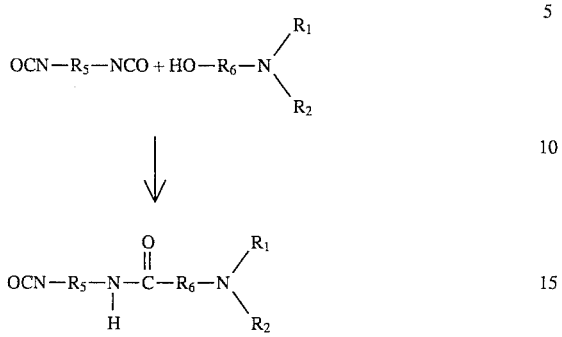

The diisocyanate is characterized in that the NCO groups are each bonded to a carbon atom having a different degree of substitution, i.e., $R_5$ is preferably a divalent organic moiety in which both valent sites of $R_5$ are carbon atoms having a different degree of substitution than the carbon atom at the other valent site. It is theorized that the different degrees of substitution enable preferential reaction of one diisocyanate group over the other diisocyanate group. In any event, the reaction occurs in such a way that generally only one of the isocyanate groups reacts, leaving the other isocyanate group unreacted. The unreacted isocyanate group enables the compound to be later reacted with any hydroxy functional compound, such as a hydroxy functional polymer. Preferably, the molar ratio of tertiary amine to diisocyanate is slightly greater than 1:1. A molar ratio of tertiary amine to diisocyanate in the range of 1.2:1 to 1:1 is desirable. The reaction should be allowed to go to completion to avoid the presence of unreacted diisocyanate, which can cause problems in further processing. Preferably, the reaction should be carried out in a solvent such as MEK or DMSO at 50–70% solids. At higher solids levels there may be excessive heat build up which may cause degradation reactions, while at lower solids levels reaction times may be unnecessarily long.

If the quaternary ammonium/isocyanate compound is desired, the isocyanate/amine precursor may be reacted with a substantially equimolar amount of a quaternizing agent to yield a compound having an isocyanate moiety and a quaternary ammonium moiety. Preferably, the quaternizing agent has the formula $R_3A$, wherein $R_3$ is an alkyl or aryl group, preferably a lower alkyl group of 1 to 4 carbon atoms. Preferably, the molar ratio of the precursor to the quaternizing agent is in the range from 1:1 to about 1.2:1, so that all of the quaternizing agent is used during the reaction. In contrast, it is not vital that all of the amine groups be quaternized. In fact, if a mixture of amine and quaternary ammonium moieties are desired the molar amount of quaternizing agent used should be less than the molar amount of amine isocyanate precursor.

Any hydroxy functional compound can be reacted with the amine isocyanate compound, the quaternary ammonium/isocyanate compound, or the mixture of amine and quaternary ammonium isocyanate compounds. Thus, these compounds provide a useful means of adding a quaternary ammonium group or an amine group to, other compounds, such as polymers. The addition of quaternary ammonium pendant groups to a polymer may occur as follows:

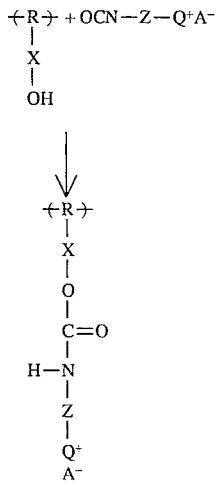

wherein

R is a segment of the polymer backbone;

X is a single bond or a divalent linking group;

Z is a divalent organic moiety;

$Q^+$ is a quaternary ammonium moiety; and $A^-$ is a monovalent anionic counterion.

Preferably the mole ratio of hydroxy groups on the polymer to the quaternary ammonium/isocyanate compound is greater than 1. In that case, the polymer will have at least two types of pendant groups, —OH and quaternary ammonium.

The reaction of the polymer and the quaternary ammonium/isocyanate compound is best carried out in a solvent such as MEK or THF at a concentration which has a viscosity that allows for easy handling. A solution of 30–40% solids has been found to be preferable. A catalyst, such as tertiary amines, e.g. triethylene diamine, or tin catalysts should be added to the reactants. While the reaction will proceed at room temperature, it is preferable to heat the reactants to 50°–60° C. for several hours. Reaction progress may be monitored by measuring the 2270 cm$^{-1}$ peak in the IR which is characteristic of the NCO functional group. Disappearance of the 2270 cm$^{-1}$ peak denotes completion of the reaction.

The addition of an amine group to a hydroxy polymer is analogous to the above reaction and may be represented as follows:

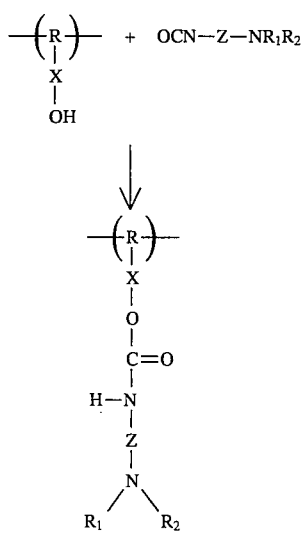

If the isocyanate compounds are a mixture of amine functional and quaternary ammonium functional, the polymer may have a combination of amine and quaternary ammonium pendant moieties. If the mole ratio of hydroxy groups to isocyanate compounds is greater than 1, the resulting polymer will have at least three types of pendant groups.

The base polymer may be any hydroxy functional polymer, including such materials as phenoxy resins, polyurethanes, polyesters, or vinyl derivatives such as polystyrene or polyvinyl chloride, or copolymers thereof. The resulting self-wetting binder could be subsequently cured with isocyanates, provided the binder contains some hydroxy groups, or by ionizing radiation (UV or e-beam) to initiate free-radical crosslinking of unsaturated groups, such as acrylates, methacrylates, isopropenyl double bonds, etc.

As previously mentioned polymers with quaternary ammonium groups and/or amine groups are useful as self-wetting binders of pigments. Accordingly, in one embodiment this invention is a dispersion comprising pigment particles in the inventive self-wetting binder. The pigment particles of the dispersion include such pigments as magnetic pigment particles, carbon black, alumina, and other pigments used in magnetic media.

Since the polymers of this invention are quite effective at dispersing magnetic pigments, another embodiment the invention is a magnetic recording medium comprising a magnetic layer having a polymeric binder with quaternary ammonium groups provided on a non-magnetizable substrate. The particular non-magnetizable substrate of the present invention may be formed from any suitable substrate material known in the art. Examples of suitable substrate materials include polymers such as polyethylene terephthalate (PET), polyimide, and polyethylene naphthalene (PEN); metals such as aluminum, or copper; paper; or any other suitable material.

The components of the magnetic layer comprise a magnetic pigment dispersed in a polymeric binder. Typically, the magnetic layer may contain 100 parts by weight of the magnetic pigment and 5 to 40 parts by weight of the polymeric binder. The type of magnetic pigment used in the present invention may include any suitable magnetic pigment known in the art including $\gamma\text{-}Fe_2O_3$, cobalt doped $Fe_2O_3$, $Fe_3O_4$, $CrO_2$, barium ferrite, barium ferrite derivatives, metal particles, and the like.

The polymeric binder of the present invention includes dispersing quaternary ammonium pendant groups which render the polymer self wetting. The polymeric binder may be represented by the formula

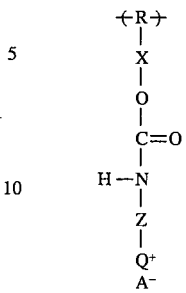

wherein
R is a segment of the polymer backbone;
X is a single bond or a divalent linking group;
Z is a divalent organic moiety;
$Q^+$ is a quaternary ammonium moiety; and
$A^-$ is a monovalent anionic counterion. The counterion is important as it may have an effect on the pigment affinity of the self-wetting binder. For example, polymers with quaternary ammonium groups and chloride counterions demonstrate particularly favorable wetting or dispersion abilities. Unfortunately, the quaternary ammonium/isocyanate compounds with chloride counterions tend to be less soluble than such compounds with sulfate or iodide counterions.

The relative number of quaternary ammonium groups will affect the degree of pigment dispersion that can be achieved by a polymer which has been produced by reaction with this compound. Quaternary ammonium groups preferably may be in the range of 0.5 to 10%, more preferably 1 to 5%, most preferably about 2% by weight of polymer.

The polymeric binder with pendant quaternary ammonium groups may also contain segments having the following formula:

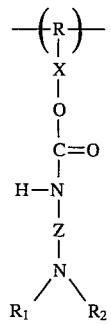

Alternatively, the polymeric binder may have no quaternary ammonium pendant group, but rather contain amine functional pendant groups.

In addition to the polymer with the quaternary ammonium group and/or the amine group described above, the magnetic recording layer in the magnetic media of this invention may include an optional secondary polymer component. This secondary polymer component may be any polymer or combination of polymers known in the art to be suitable as a binder material for magnetic recording media. Examples of suitable polymers include polyurethanes, polyvinyl butyrals, polyesters, etc.

The magnetic layer of the magnetic recording media of the present invention may also comprise one or more conventional additives such as lubricants; abrasives;

crosslinking agents; head cleaning agents; thermal stabilizers; antioxidants; dispersants; wetting agents; fungicides; bactericides; surfactants; coating aids; nonmagnetic pigments; and the like in accordance with practices known in the art. The self-wetting binders of this invention may also efficiently disperse the non-magnetic pigments, such as carbon black, alumina, etc.

As one example of a process for preparing a magnetic recording medium, the components of the magnetic layer are combined and mixed with a suitable solvent to form a substantially homogeneous dispersion. The dispersion is then coated onto a non-magnetizable substrate, which may be primed or unprimed. The dispersion may be applied to the substrate using any conventional coating technique, such as gravure or knife coating techniques. The coated substrate may then be passed through a magnetic field to orient the magnetic pigment after which the coating is dried, calendared if desired, and then allowed to cure.

Curing can be accomplished in a variety of ways. As one approach, if the polymer has unreacted hydroxy pendant groups, an isocyanate crosslinking agent can be added to the dispersion just before the dispersion is coated onto the substrate. As soon as the isocyanate crosslinking agent is added to the dispersion, the NCO groups of the isocyanate crosslinking agent will begin to react with the hydroxy groups on the polymeric binder. However, while solvent is present the reaction proceeds slowly enough to allow time for coating. The reaction speed accelerates during and after drying due to the higher reactant concentrations and the heat provided during drying. A catalyst, e.g., dibutylitin dilaurate, may be added in suitable catalytic amounts in order to facilitate the crosslinking reaction. Generally, using from 0.02 to 0.2 parts by weight of catalyst per 100 parts by weight of magnetic pigment has been found to be suitable in the practice of the present invention.

The isocyanate crosslinking agent is a polyfunctional isocyanate having an average functionality of at least 2 isocyanate groups per molecule. Examples of specific polyfunctional isocyanates useful as the isocyanate crosslinking agent in the practice of the present invention include materials commercially available as MONDUR CB-601, CB-75, CB-701 from Miles, Inc.; DESMODUR L available from Bayer A. G.; CORONATE L from Nippon Polyurethane Ind., Ltd.; and PAPI from Union Carbide Corp.

The isocyanate crosslinking agent is preferably used in an amount such that the molar ratio of NCO groups from the isocyanate crosslinking agent to the total number of hydroxy groups from the hydroxy functional polymer is in the range from 0.3 to 5, more preferably 0.5 to 1.5.

As another approach, when one or more of the components of the polymeric binder contain radiation curable moieties, the dried coating may be irradiated to achieve curing of the radiation curable materials. Irradiation may be achieved using any type of ionizing radiation, e.g., electron beam, ultraviolet, etc. in accordance with practices known in the art. Preferably, radiation curing is achieved with an amount of electron beam radiation in the range from 1 to 20 Mrads, preferably 4 to 12 Mrads, and more preferably 5 to 9 Mrads of electron beam radiation having an energy in the range from 100 to 400 keV, preferably 200 to 250 keV.

Although electron beam irradiation may occur under ambient conditions, an inert atmosphere is preferred as a safety measure in order to keep ozone levels to a minimum and to increase the efficiency of curing. "Inert atmosphere" means an atmosphere comprising nitrogen or a noble gas and having an oxygen content of less than 500 parts per million.

The use of radiation curing techniques may offer some advantages over isocyanate curing techniques. Whereas isocyanate curing of magnetic media is chemically unselective and highly dependent on such variables as temperature and humidity, radiation curing techniques are less sensitive to temperature and humidity. Moreover, radiation curing techniques allow one to control, to a certain extent, which polymers become crosslinked and which polymers do not become crosslinked, in that only those polymers with radiation curable moieties generally are crosslinked. Traditionally radiation curable formulations have relied upon the reactivity of acrylates, methacrylates and the like. One draw back of magnetic dispersions prepared from such materials, is that they tend to undergo unwanted crosslinking reactions under ambient conditions to form gels.

The invention is further described in the following examples.

EXAMPLES

Example 1

Preparation of Compound I (Amine Isocyanate Intermediate)

Isophorone diisocyanate (IPDI, 192 g) and dimethylethanolamine (DME, 85.5 g) were added to MEK (methyl ethyl ketone 160 g) while stirring. The reaction flask was equipped with a water-cooled reflux condenser. In about 15 minutes the temperature rose to 60° C. and stayed at 60°–70° C. for an hour. The reaction was allowed to go to completion for 16 hours, thereby minimizing the IPDI residual level which may cause gelation from crosslinking and chain extension in the subsequent quaternization step. The final solution of I was slightly yellow and had a low viscosity.

Example 2

Conversion of Compound I to Compound II (Quaternary Ammonium Methyl Sulfate)

A solution of dimethyl sulfate, $(CH_3)_2SO_4$ (114 g), in MEK (54 g) was added to the entire solution of I from Example 1, slowly with stirring. The rate of addition was varied to keep the temperature at 45°–55° C. for 40 min. The reaction mixture was then allowed to stand for 16 hours to yield a slightly orange colored low viscosity solution of II in MEK (65% solids). The orange color most likely came from dark brown oily contaminants in dimethylsulfate. The molar ratio of I:$(CH_3)_2SO_4$ in this example was calculated for complete conversion of the amine to the quaternary ammonium group. Different levels of quaternization using different I:$(CH_3)_2SO_4$ ratios would yield intermediates containing both the amine and the quaternary ammonium groups in addition the second isocyanate group of IPDI.

Example 3

Synthesis of Compound III-Self-Wetting Binder

Union Carbide Phenoxy PKHH (bisphenol A-Epichlorohydrin copolymer) (30 g) was first dissolved in MEK (70 g) and then 1-(1-isocyanato-1-methylethyl)-3-(1-methyl ethenyl) benzene (TMI 10.5 g) from American Cyanamide. The solution of II from Example 2 (10.2 g, 45.3% solids) and dibutyltindilaurate catalyst (DBTDL 0.08 g) were added to the PKHH solution and allowed to stand in a tightly capped bottle at room temperature. In 48 hours, the isocyanate peak in the IR (2200–2300 $cm^{-1}$) spectrum of the reacting polymer/Compound II solution (cast as a thin film on a salt plate) had completely disappeared indicating total consumption of the isocyanate groups of both TMI and Compound II. In one step both the isopropenyl unsaturated group and the quaternary ammonium methyl sulfate group are attached to the PKHH backbone, with 50% of the hydroxy groups on PKHH reacting with TMI isocyanate and 10% of the hydroxy groups reacting with the Compound II isocyanate group. The resulting MEK solution contained binder compound III with isopropenyl unsaturation for electron beam curing and quaternary ammonium methyl sulfate pendant groups for dispersing magnetic and carbon black pigments.

Example 4

Preparation of Compound IV (quaternary ammonium iodide) in DMSO Solvent

A fresh sample of Compound I was first prepared using 88 g IPDI, 39 g DME and 80 g DMSO (dimethyl sulfoxide) solvent according to the procedure described in Example 1. A solution of 56.8 g methyl iodide, $CH_3I$, in 47 g DMSO was added slowly to the stirred solution of I, controlling the exothermic reaction by adjusting the rate of addition to keep the temperature below 55° C. After allowing to stand for 16 hours at room temperature, the solution of IV was ready to be used in subsequent reaction with hydroxy binder resulting in pendant quaternary ammonium iodide groups on the polymer backbone.

Example 5

Synthesis of Self-Wetting Binder, V

Union Carbide Phenoxy PKHH was first reached with TMI so that 50% of the hydroxy groups on PKHH were converted to radiation curable isopropenyl groups. The resulting polymer (600 g solids) in MEK (1062 g) was then mixed with a solution of IV (151 g IV+151 g DMSO), DBTDL (15 g) and DMSO (219 g) by shaking the contents well in a one gallon glass bottle. The reaction mixture was allowed to stand at room temperature and the disappearance of the isocyanate peak in the IR spectrum of polymer smear on salt plate (2200–2300 $cm^{-1}$) was monitored to follow reaction progress. The reaction had gone to completion in 22 hours to yield a clear, dark red and highly viscous solution of the self-wetting binder V in MEK/DMSO solvent (75/25). Fifty percent of the hydroxy groups on PKHH were reacted with TMI and 24% with IV. This quaternary ammonium level (25% of IV based on the weight of PKHH) was much higher than what is generally required for effective dispersion of magnetic pigments (1–3% based on the weight of the hydroxy polymer).

Example 6

Preparation of VI (Quaternary Ammonium Chloride)

Compound I was freshly prepared using 44 g of IPDI, 19 g of DME, and 40 g DMSO, according to the procedure described in Example 1. In the second step, Methyl Chloride gas, $CH_3Cl$, from a lecture bottle was bubbled through the solution of I. Immediately VI precipitated out as a white solid.

Example 7

Effect of Counter Ion Type on the Pigment Dispersing Efficiency (a) Preparation of Compound VII-MEK soluble phenoxy Compound VII was synthesized by reacting 20% of the hydroxy groups on Union Carbide PKHH with TMI. Compound VII is more MEK soluble and compatible with other polymethane type soft polymers, than is the parent PKHH.

(b) Preparation of Self-Wetting Binders, VIII (iodide counterion) and IX (methyl sulfate counterion)

The compound VII (100 g solid) was reacted separately with Compound IV (6.0 g, 0.013 mole) and II (5.78 g, 0.013 mole) in MEK at 30% solids in the presence of DBTDL (0.318 g, 0.3% based on total solids) in closed jars, to give compounds VIII and XI, respectively. The jars were heated in a water bath as 50°–60° C. for three hours, at the end of which the isocyanate peak in the IR (2200–2300 $cm^{-1}$) had completely disappeared. The resulting solutions of VIII and IX solutions were clear, slightly yellow and very viscous.

(c) Preparation of Self-Wetting Binder, X (chloride counterion)

Self-wetting binder with quaternary ammonium chloride pendant groups was synthized by first reacting PKHH with I and then quaternizing the amine groups on the polymer. Compound VII (100 g), I (3.91 g, 0.013 mole), and DBTDL (0.16% based on total solids) were mixed well with MEK at 30% solids and allowed to react for 48 hours. Methyl chloride gas was then bubbled through the solution until saturation to yield the self-wetting binder, X, in MEK. Additional MEK was added to arrive at 30% solids.

(d) Procedure for Making Diskette Dispersions

Four dispersions containing binders VII, VIII, IX and X binders were milled in an Igarashi Mill (1600 rpm, 9 hour, steel media) along with a control dispersion containing EC-130 binder (copolymer of vinyl chloride, methacrylated quaternary ammonium chloride, and other monomers, made by free radical copolymerization, from Sekisui Chemical Co.) for comparison, using the following formulation:

| | |
|---|---|
| $\gamma$-$Fe_2O_3$: | 100 |
| Carbon Black: | 7 |
| Alumina: | 10 |
| Binder: | 23 |

After nine hours milling in MEK/cyclohexanone Solvent (80/20), the dispersions were dumped, thinned down to 30% solids and activated by adding the following amounts of activator/lubricants: Mondur CB-601 (10 pph magnetic pigment, from Mobay), oleic acid (1.5 pph magnetic pigment), and isocetyl stearate (4.5 pph magnetic pigment).

(e) Dispersion Viscosity

The final dispersions were evaluated for viscosity at different shear rates using a Brookfield viscometer. The following table of viscosity at a shear rate of 20 $sec^{-1}$ for the 5 different binders clearly indicates the effect of quaternary ammonium groups on low shear viscosity compared to VII with no quaternary ammonium groups. An increase in low shear viscosity results from stronger bonding interaction between the pigment surface and the binder.

| Binder | Counter Ion | Viscosity (cP) |
|---|---|---|
| VII | None | 270 |
| VIII | Iodide | 340 |
| IX | Methyl Sulfate | 600 |
| X | Chloride | 720 |
| EC-130 | Chloride | 430 |

Binder VIII, with iodide ion, showed a modest increase in low shear viscosity compared to VII, which had no quaternary ammonium groups. Binders IX and X showed significant increases due to stronger binder/pigment interaction. Thus, the pigment-ammonium interaction varies depending on the counter ion type in the following order: quaternary ammonium polymer with chloride counter ion showed greater pigment interaction than did the quaternary ammonium polymer with methyl sulfate counterion. The quaternary ammonium polymer with methyl sulfate counter ion showed greater pigment interaction than did the quaternary ammonium polymer with the iodide counterion. This comparison was done on a molar basis.

(f) Bulk Electromagnetic/Gloss on Handspread Coatings

The five dispersions were coated on 3 mil polyester substrate at a nominal thickness of 2 microns and bulk electromagnetics were measured on an MH meter. 45° gloss measurements were also made on the hand spreads. The following table clearly shows that the stability of the magnetic oxide coercivity depends on the counter ion type in the order:

Chloride>Methyl Sulfate>Iodide>No counterion. Goodness number, $G_n$, is a dimensionless number (reciprocal of switching Field Distribution) that measures coercivity distribution. $G_n=H_c/\Delta H_c$, where $H_c$ is coercivity and $\Delta H_c$ is the width of coercivity range at half peak height.

| Dispersion Sample | Binder | Coercivity, $H_c$ (Oe) | $G_n$ | 45° Gloss |
|---|---|---|---|---|
| 1 | VII | 653 | 0.85 | <1 |
| 2 | VIII | 660 | 0.89 | 7 |
| 3 | IX | 713 | 1.15 | 9 |
| 4 | X | 718 | 1.13 | 7 |
| 5 | EC-130 | 718 | 1.20 | 19 |

The quaternary ammonium compounds with methyl sulfate or chloride counterions gave high goodness numbers indicating good dispersion of the pigments in the binder.

Example 8

Synthesis of Prepolymer, XI

The prepolymer XI was synthesized by charging a bottle with styrene (90 g), acrylonitrile (75 g), hydroxy ethyl methacrylate (65 g), n-ethyl perfluorosulfonamido ethyl methacrylate (20 g) (see U.S. Pat. No. 2,803,615, Example 3), Vazo-64™ (1.25 g) (2,2'-azobisisobutyronitrile thermal initiator, from DuPont), mercaptopropanediol (0.75 g) and MEK (395 g); purging with $N_2$ for five minutes at a rate of 1 liter/minute; and tumbling the contents in the bottle at 65° C. for 60 hours in a constant temperature water bath. At the end of the reaction, a clear viscous solution was obtained, with practically no monomer smell, indicating complete polymerization. This synthesis was repeated several times and the solutions were combined for use in subsequent reactions.

Example 9

Conversion of XI to the self-wetting binder, XII

The hydroxy polymer XI from Example 8 was converted to the isocyanate curable binder XII with quaternary ammonium methyl sulfate pendant groups for dispersing magnetic oxide pigments. A solution of 2400 g of polymer XI solution (39% solids in MEK), 44.3 g Solution of II(65% solids in MEK), 1.6 g DBTDL and 29 g MEK was shaken well in a one gallon glass bottle and allowed to stand at room temperature for two days. The reaction time (indicated by the disappearance of the isocyanate peak in the IR at 2200–2300 $cm^{-1}$) can be shortened to 3–4 hours by heating in a constant temperature water bath at 60° C. The resulting solution of XII was viscous and slightly yellow with a shelf life of over 12 months; it has II at 3% based on the weight of polymer XI.

Example 10

Conversion of polymer XI to self-wetting polymer XIII

The prepolymer XI from Example 8 was converted to electron beam radiation curable binder, XIII, with quaternary ammonium methyl sulfate pendant groups. A solution of 2400 g of XI solution (39% solids in MEK), 297 g TMI, 43 g Solution of II (65% solids in MEK), 2 g DBTDL, 0.2 g butylated hydroxy toluene stabilizer, and 425 g MEK was shaken in a one gallon bottle and allowed to stand for two days at room temperature. The reaction had gone to completion as evidenced by the absence of isocyanate peak at 2200–2300 $cm^{-1}$ in the IR spectrum of a film cast on a salt plate. The resulting viscous, clear solution of XIII in MEK contained Compound II, TMI and DBTDL at 3, 32 and 0.21% by weight of polymer XI.

Example 11

Procedure for Making Diskette Dispersion Using XIII

A premix containing iron oxide (20 lbs), carbon black (1.4 lb), XIII (2.6 lbs), sulfonated and hydroxy containing unsaturated polyurethane binder (hereinafter referred to as "SHUPU") (1.7 lbs), and MEK solvent (33 lbs) was prepared. The SHUPU is the product of sulfonated hydroxy functional polyurethane (SHPU), as described in U.S. Pat. No. 5,185,423, col. 6, line 20, with TMI so that 80% of the hydroxy functional groups are converted to unsaturated groups. The SHUPU was nade by reacting 1500 g SHPU in MEK at 38.8% solids and 0.34 hydroxy equivalents, with 55 g of TMI (0.27 isocyanate equivalents, in 38 g MEK. DBTDL catalst (1 g) and 0.13 g butylated hydroxy toluene stabilizer were also added. The reaction mixture was allowed to stand for 48 hours. Reaction completion was indicated by the disappearance of the isocyanate IR peak (2200– 2300 $cm^{-1}$).

The premix was milled (4-liter sandmill) at 44% solids until the dispersion was smooth reaching an optimum point as shown by analysis of hand spreads made with dispersion samples pulled out periodically, looking for changes in gloss, coercivity, resistivity, etc. The mill base was let down by adding premilled alumina, Ebecryl-220 (free radical generator from Radcure Specialties, Inc.), and oleic acid/isocetyl stearate lubricant, at 10, 9 and 6 pph magnetic oxide, respectively. The dispersion was thinned down to 30% solids with MEK solvent. The final dispersion was analyzed for viscosity at low shear rates, along with three other control dispersions formulated with everything similar except the binder.

Control dispersion I contained a combination of a self-wetting binder and a polyurethane soft binder. Control dispersion II contained a sulfonated hydroxy-functional polyurethane (SHPU) binder as described in U.S. Pat. No. 5,185,423, col. 6, line 20. Control dispersion III was made with a combination of RJ-100 (a styrene allyl alcohol copolymer from Monsanto Co.) and a hydroxy functional polyurethane (HPU) as described in U.S. Pat. No. 4,837,082, col. 9. Since these polymers do not have self-wetting groups, low MW dispersants were added to the dispersion.

| Dispersion | Self-Wetting Binder | Additional Binder | Chemistry | Viscosity |
|---|---|---|---|---|
| A | XIII | SHUPU | Quat. amm. methyl sulfate hydroxy, unsaturation, sulfonate | 1560 |

-continued

| Dispersion | Self-Wetting Binder | Additional Binder | Chemistry | Viscosity |
|---|---|---|---|---|
| Control I | EC-130 (Sekisui Chemical Co.) | TI-7503 (Sanyo Chemical Corp.) | Quat. amm. Chloride, hydroxy | 720 |
| Control II | SHPU as in U.S. Pat. No. 5,185,423 | — | Sulfonate, hydroxy | 930 |
| Control III | — | RJ-100 (Monsanto) & HPU as in U.S. Pat. No. 4,827,082 | Hydroxy only | 270 |

As the above Table indicates, the low shear viscosity (shear rate=20 sec$^{-1}$) as measured on a Brookfield cone/plate viscometer was the highest for the experimental dispersion, A, and the lowest for III control with no self-wetting groups, the other two dispersions falling in the middle (% solids were kept at 30% for all the dispersions).

Example 12

Procedure for Making 2 MB Diskettes with Self-Wetting Binder XIII A 2 MB diskette dispersion was sandmilled at 44% solids until smooth using the following ingredients:

Cobalt doped γ-iron oxide (20 lbs.), carbon black (1.4 lbs.), XIII (2.42 lbs.), terminal hydroxy functional polyester polyurethane as described in U.S. Pat. No. 4,693,930, col. 7, line 17 (1.61 lbs.) and solvent (32.4 lbs., 80/20 MEK/cyclohexanone). The mill base was subsequently let down with premilled alumina (10 pph magnetic oxide), oleic acid and isocetyl stearate lubricants (6 pph magnetic oxide) and Sartomer SR-399™ radiation crosslinker (9 pph magnetic oxide). The dispersion was thinned down to 30% solids with solvent. The final dispersion was web coated on 3 mil polyester substrate and e-beam cured with 10 Mrads (in-line) at 225 Kev voltage. The coated web was converted/processed to finished 3.5" 2 MB diskettes that were evaluated for electrical, error quality, durability and friction. The following list of results from various tests indicated that the 2 MB diskettes made using the self-wetting binder XIII showed excellent performance.

| Electricals | % Gold Reference |
|---|---|
| 2F Amplitude | 93.3% |
| Electricals | % Gold |
| Resolution | 95.6 |
| Modulation | 5.3% |
| Error Quality | |
| Extrapulse (EP) threshold | 14 |
| Missing Pulse (MP) threshold | 70 |
| Durability/Stability | |
| 4 Hr Accelerated Wear: | 100% Pass (n = 8) |
| Realtime Durability: | >3 million passes |
| Running Torque (Sony 17W 2MB Drive): | 35 gm-cm |

Example 13

Procedure for Making Isocyanate Curable Diskette Dispersion Using XII

A premix containing cobalt doped gamma iron oxide (20 lbs.), carbon black (1.2 lbs.), XII (2.03 lbs.), HPU as described in U.S. Pat. No. 4,837,082, col. 9 (1.36 lbs.), and solvent (MEK/cyclohexanone/toluene 57/32/11) was sandmilled until smooth and a small portion was coated on 3 mil polyester substrate. The electromagnetics, gloss, surface smoothness and resistivity were all found to be acceptable, with less than 5% drop in oxide coercivity thereby indicating efficient dispersing of the cobalt doped gamma iron oxide pigment by binder XII.

What is claimed is:

1. A magnetic recording medium, comprising a magnetizable layer provided on a non-magnetizable support, wherein the magnetizable layer comprises magnetic pigment particles dispersed in a polymeric binder, said binder being a cured blend of components comprising a self-wetting polymer comprising a plurality of chain segments of the formula

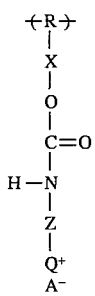

wherein

R is a segment of the polymer backbone;

X is a single bond or a divalent linking group;

Z is a divalent organic moiety of the formula

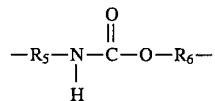

wherein each of $R_5$ and $R_6$ is independently a divalent, organic linking group;

$Q^+$ is a quaternary ammonium moiety; and $A^-$ is a monovalent anionic counterion.

2. The magnetic recording medium of claim 1, wherein $Q^+$ has the formula

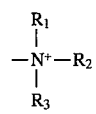

wherein each of $R_1$, $R_2$, and $R_3$ is independently an alkyl or an aryl group.

3. The magnetic recording medium of claim 2, in which each of $R_1$, $R_2$, and $R_3$ independently is a lower alkyl group of 1 to 4 carbon atoms.

4. The magnetic recording medium of claim 2, in which each of $R_1$, $R_2$, and $R_3$ is —$CH_3$.

5. The magnetic recording medium of claim 1, in which $A^-$ is selected from the group consisting of I$^-$, Cl$^-$, alkyl sulfate, aryl sulfate, Br$^-$, sulfobetaines, and phosphobetaines.

6. The magnetic recording medium of claim 1, in which $A^-$ has the formula

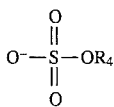

wherein $R_4$ is an alkyl or aryl group.

7. The magnetic recording medium of claim 6, in which $R_4$ is —$CH_3$.

8. The magnetic recording medium of claim 1, in which $R_6$ is —$CH_2CH_2$—.

9. The magnetic recording medium of claim 1, in which $R_5$ is a divalent organic moiety in which both valent sites of $R_5$ are carbon atoms, each of these carbon atoms having a different degree of substitution than the carbon atom at the other valent site.

10. The magnetic recording medium of claim 1, in which $R_5$ has the formula

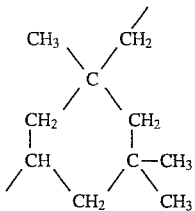

and $R_6$ is —$CH_2CH_2$—.

11. The magnetic recording medium of claim 1, in which the self-wetting polymer further comprises a plurality of radiation curable moieties.

12. The magnetic recording medium of claim 1 in which the polymer is a phenoxy resin.

13. The magnetic recording medium of claim 1 in which the polymer is a polyurethane.

14. The magnetic recording medium of claim 1 in which the polymer is a polyester.

15. The magnetic recording medium of claim 1 in which the polymer is a vinyl chloride polymer.

16. The magnetic recording medium of claim 1 in which said self-wetting polymer further comprises chain segments of the formula

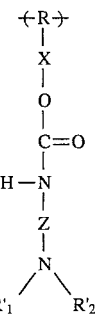

wherein

R is a segment of the polymer backbone;

X' is a single bond or a divalent linking group;

Z' is a divalent organic moiety of the formula

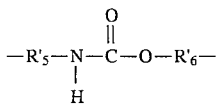

wherein each of $R'_5$ and $R'_6$ is independently a divalent, organic linking group; and $R_1'$ and $R_2'$ are independently an alkyl or an aryl group.

17. The magnetic recording medium of claim 16 wherein $R_5$ has the formula

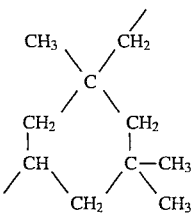

and $R_6$ is —$CH_2CH_2$—.

* * * * *